US012586471B2

(12) United States Patent
Hayashi et al.

(10) Patent No.: US 12,586,471 B2
(45) Date of Patent: Mar. 24, 2026

(54) INFORMATION PROCESSING APPARATUS, INFORMATION PROCESSING METHOD AND PROGRAM

(71) Applicant: NTT, Inc., Tokyo (JP)

(72) Inventors: Aki Hayashi, Musashino (JP); Yuki Yokohata, Musashino (JP); Kohei Mori, Musashino (JP); Takahiro Hata, Musashino (JP); Kazuaki Obana, Musashino (JP)

(73) Assignee: NTT, Inc., Tokyo (JP)

( * ) Notice: Subject to any disclaimer, the term of this patent is extended or adjusted under 35 U.S.C. 154(b) by 56 days.

(21) Appl. No.: 18/690,339

(22) PCT Filed: Sep. 27, 2021

(86) PCT No.: PCT/JP2021/035282
§ 371 (c)(1),
(2) Date: Mar. 8, 2024

(87) PCT Pub. No.: WO2023/047563
PCT Pub. Date: Mar. 30, 2023

(65) Prior Publication Data
US 2024/0379006 A1 Nov. 14, 2024

(51) Int. Cl.
*G08G 1/01* (2006.01)
*G08G 1/00* (2006.01)

(52) U.S. Cl.
CPC ............. *G08G 1/20* (2013.01); *G08G 1/0125* (2013.01)

(58) Field of Classification Search
CPC ...... G08G 1/20; G08G 1/0125; G08G 1/0112; G08G 1/09; G07B 15/06
See application file for complete search history.

(56) References Cited

U.S. PATENT DOCUMENTS

2008/0258936 A1 10/2008 Chitor et al.
2014/0172521 A1 6/2014 Itaya et al.
2019/0300172 A1* 10/2019 Di Benedetto .......... G08G 5/55

FOREIGN PATENT DOCUMENTS

CN 111127679 A 5/2020
WO WO-2013/018656 A1 2/2013

OTHER PUBLICATIONS

"Road Pricing in Europe and America", Continuous Course of Expressway Organization Overseas Research Series, Expressway Organization Overseas Research Series, No. 9, Japan Expressway Holding and Debt Repayment Agency, Jan. 2010, pp. 21-25, [Searched on Jul. 30, 2021], <URL:https://www.jehdra.go.jp/pdf/research/r079.pdf>.

* cited by examiner

*Primary Examiner* — Ashley L Redhead, Jr.

(57) ABSTRACT

An information processing device includes a travel request acquisition unit that acquires travel request information for requesting travel permission of a specific road by a first vehicle, a number-of-vehicles acquisition unit that acquires a number of traveling vehicles indicating a number of a plurality of second vehicles traveling on the specific road, a determination unit that determines traveling availability on a basis of the number of traveling vehicles and an appropriate number of vehicles indicating an appropriate number of vehicles traveling on the specific road, and a transmission unit that transmits information indicating a determination result of the traveling availability to the first vehicle.

10 Claims, 6 Drawing Sheets

T1

| VEHICLE ID | LANE | TRAVELING CONDITION |
|---|---|---|
| 00001 | GENERAL LANE | 500 YEN |
| 00002 | PRIORITY LANE | 800 YEN |
| 00003 | GENERAL LANE | 400 YEN |
| ⋮ | ⋮ | ⋮ |

INFORMATION PROCESSING APPARATUS, INFORMATION PROCESSING METHOD AND PROGRAM

CROSS-REFERENCE TO RELATED APPLICATIONS

This application is a 371 U.S. National Phase of International Application No. PCT/JP2021/035282, filed on Sep. 27, 2021. The entire disclosure of the above application is incorporated herein by reference.

TECHNICAL FIELD

The present invention relates to an information processing apparatus, an information processing method and a program.

BACKGROUND ART

A variety of types of mobility including automobiles have led to abundance of people's lives along with technological evolution. On the other hand, against the background of changes in the social structure including low birth rate, aging, concentration of population in urban areas, and the like, there is also concern for various social problems related to road traffic being more serious. The social problems related to road traffic include, for example, an increase in traffic accidents related to elderly people, reduction and elimination of public transportation due to local depopulation, an increase in people disadvantaged in mobility due to return of driver's licenses by elderly people, economic loss and environmental problems due to traffic jams and congestion in urban areas, and a shortage of bearers of the logistics industry due to an increase in logistics demand due to expansion of e-commerce.

Against the background of such social problems, research and development and demonstration experiments for sophistication of connected car services mainly by automobile manufacturers, implementation of multimodal mobility as a service (MaaS), and the like are in progress. Particularly in Japan, for example, research and development in a common field (cooperative region) and the like to be worked on by industry, academia, and government have been promoted. With the sophistication of connected cars and automatic driving functions, communication networks supporting these technologies are also becoming an important and indispensable infrastructure.

Furthermore, in recent years, with the remarkable development of information and communication technology (ICT), collecting and analyzing enormous Internet of Things (IoT) data are becoming possible. Along with this, the government and various companies are conducting research and development aiming at practical application of an information system in which a cyberspace and a physical space are highly fused, for example, as proposed in Society 5.0 and the like. However, in fusion of a cyberspace and a physical space, even if data that has already been statistically processed or data in which position or time information is deviated from each other is multiplied, the accuracy of grasping a phenomenon in the real world and future prediction may not necessarily be improved.

In order to solve such an issue, construction of a system base that enables collection of various types of sensing data regarding people, things, and matters in real time, matching of four-dimensional information including "latitude, longitude, altitude, and time" with high accuracy, data fusion between integrated sensing data and various industrial bases, and provision of data contributing to future prediction is in progress.

CITATION LIST

Non Patent Literature

Non Patent Literature 1: "Kousoku douro kikou kaigai chousa series renzoku kouza "Oubei no road pricing" (in Japanese) (Continuous Course of Expressway Organization Overseas Research Series "Road Pricing in Europe and America")", [online], Expressway Organization Overseas Research Series No. 9, Japan Expressway Holding and Debt Repayment Agency, pp. 21-25, January 2010, [Searched on Jul. 30, 2021], the Internet <URL: https://www.jehdra.go.jp/pdf/research/r079.pdf>

SUMMARY OF INVENTION

Technical Problem

Conventionally, in response to a social problem such as traffic jams and congestion in urban areas described above, a toll road system has been implemented for the purpose of, by providing a traveling lane that can be preferentially used only by people who have paid a predetermined usage fee (hereinafter, the lane is referred to as a "priority lane") separately from a normal traveling lane (hereinafter, the lane is referred to as a "general lane") and setting the usage fee of the priority lane higher than the usage fee of the general lane, alleviating a traffic jam and congestion at least in the priority lane (see Non Patent Literature 1). As a result, a user who wants to arrive at a destination earlier may be able to avoid a traffic jam and congestion by using the priority lane.

However, in the toll road system described in Non Patent Literature 1, anyone can use a priority lane as long as a predetermined usage fee is paid. Therefore, in a case where the number of vehicles traveling on the priority lane exceeds the upper limit of an appropriate number, a traffic jam and congestion are not alleviated after all. As a result, there is an issue that a user may not be able to avoid a traffic jam and congestion even by using the priority lane.

In view of the above circumstances, an object of the present invention is to provide an information processing apparatus, an information processing method and a program that enable a user to avoid a traffic jam or congestion.

Solution to Problem

One aspect of the present invention is an information processing device including a travel request acquisition unit (a travel request acquirer) that acquires travel request information for requesting travel permission of a specific road by a first vehicle, a number-of-vehicles acquisition unit (a number-of-vehicles acquirer) that acquires a number of traveling vehicles indicating a number of a plurality of second vehicles traveling on the specific road, a determination unit (a determiner) that determines traveling availability on a basis of the number of traveling vehicles and an appropriate number of vehicles indicating an appropriate number of vehicles traveling on the specific road, and a transmission unit (a transmitter) that transmits information indicating a determination result of the traveling availability to the first vehicle.

Furthermore, one aspect of the present invention is an information processing method including a travel request acquisition step of acquiring travel request information for requesting travel permission of a specific road by a first vehicle, a number-of-vehicles acquisition step of acquiring a number of traveling vehicles indicating a number of a plurality of second vehicles traveling on the specific road, a determination step of determining traveling availability on a basis of the number of traveling vehicles and an appropriate number of vehicles indicating an appropriate number of vehicles traveling on the specific road, and a transmission step of transmitting information indicating a determination result of the traveling availability to the first vehicle.

Furthermore, one aspect of the present invention is a program for causing a computer to function as the information processing device.

Advantageous Effects of Invention

According to the present invention, a user can avoid a traffic jam or congestion.

DESCRIPTION OF EMBODIMENTS

Hereinafter, a traveling lane adjustment system according to embodiments of the present invention will be described.

First Embodiment

Figure 1:
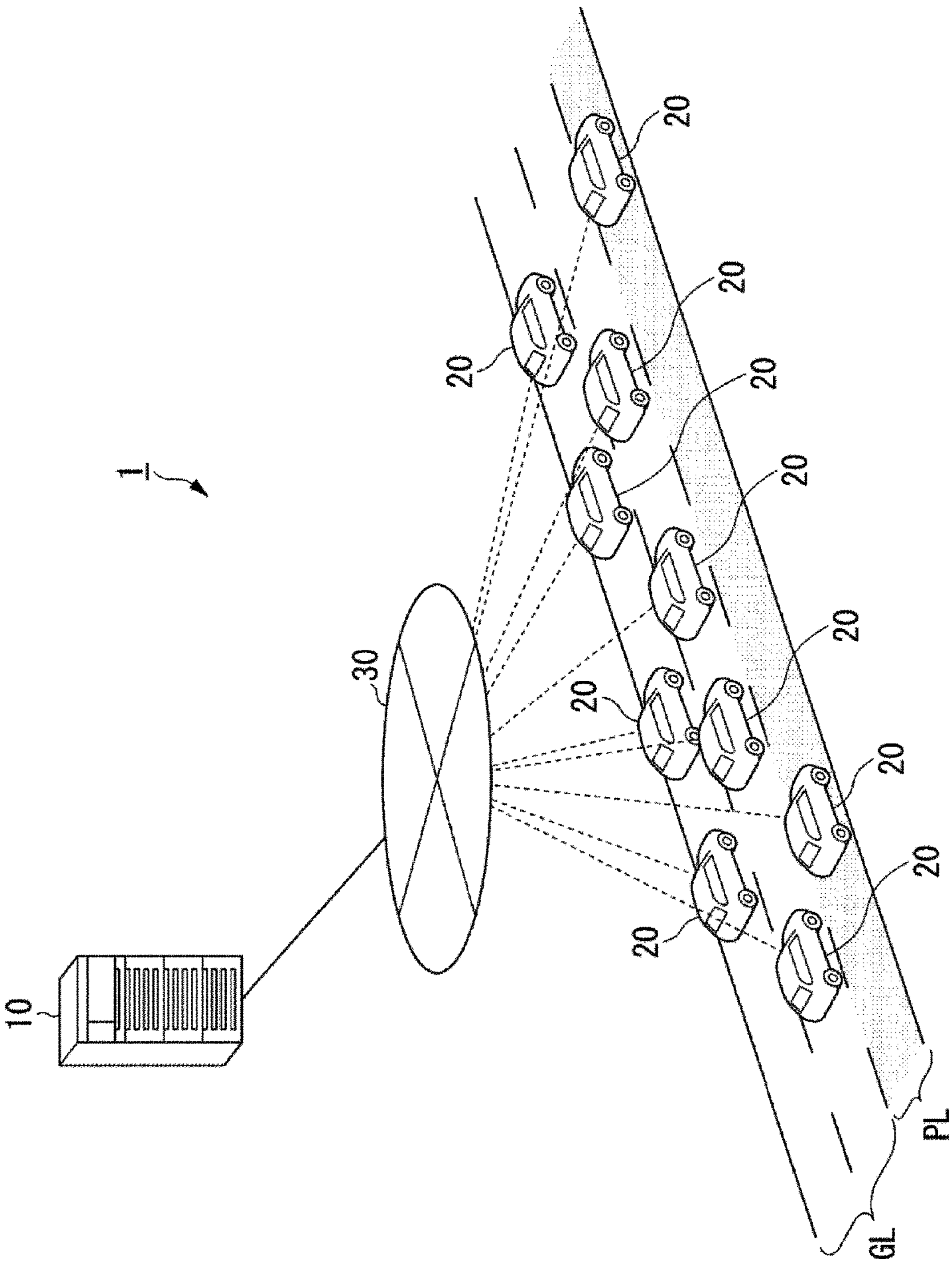
FIG. 1 is an overall configuration diagram of a traveling lane adjustment system 1 according to a first embodiment of the present invention.

A first embodiment of the present invention will now be described with reference to the drawings. FIG. 1 is an overall configuration diagram of a traveling lane adjustment system 1 according to the first embodiment of the present invention.

The traveling lane adjustment system 1 is an information system for adjusting vehicles permitted to use a priority lane in response to requests from a plurality of users who use vehicles traveling on a road including a general lane and a priority lane. The users here are, for example, passengers of vehicles. As illustrated in FIG. 1, the traveling lane adjustment system 1 includes a traveling lane adjustment device 10, a plurality of vehicles 20, and a communication network 30.

The traveling lane adjustment device 10 includes an information processing device (apparatus) such as a general-purpose computer, for example. The traveling lane adjustment device 10 is, for example, an information processing device managed by a business operator that provides a traveling lane adjustment service by the traveling lane adjustment system 1. The traveling lane adjustment device 10 can transmit and receive information to and from the vehicles 20 via the communication network 30.

The traveling lane adjustment device 10 acquires position information indicating the positions of the vehicles 20 traveling on a road including a general lane GL and a priority lane PL from the respective vehicles 20. The traveling lane adjustment device 10 counts the number of vehicles actually traveling (hereinafter, referred to as the "number of actually traveling vehicles") for each section of the road and each type of traveling lane (that is, for each of the general lane GL and the priority lane PL) on the basis of the acquired position information.

The traveling lane adjustment device 10 also acquires, from a vehicle 20, information indicating a user's desire for using the priority lane PL (hereinafter, the information is referred to as a "priority lane travel request"). The traveling lane adjustment device 10 determines whether to permit travel on the priority lane PL in response to the priority lane travel request from the vehicle 20 on the basis of a predetermined upper limit of the appropriate number of traveling vehicles (hereinafter, referred to as the "appropriate maximum number of traveling vehicles") of the priority lane PL and the above-described number of actually traveling vehicles. Note that the appropriate number of traveling vehicles mentioned here is, for example, the number of vehicles within a range in which a traffic jam or congestion does not occur in the priority lane PL.

The traveling lane adjustment device 10 transmits information indicating that travel on the priority lane PL is permitted (hereinafter, the information is referred to as "priority lane travel permission") or information indicating that travel on the priority lane PL (hereinafter, the information is referred to as "priority lane travel non-permission") is not permitted to the vehicle 20 that has transmitted the priority lane travel request.

Note that the traveling lane adjustment device 10 may transmit other information to the vehicles 20. For example, the traveling lane adjustment device 10 may transmit, to a vehicle 20 traveling on the priority lane PL, information indicating an instruction for changing the lane to the general lane GL and forcibly transferring of the use of the priority lane PL to another vehicle 20 (hereinafter, the information is referred to as a "priority lane transfer instruction"). For example, the traveling lane adjustment device 10 may transmit, to a vehicle 20 traveling on the priority lane PL, information for inquiring whether to transfer the use of the priority lane PL to another vehicle 20 by changing the lane to the general lane GL (hereinafter, the information is referred to as a "priority lane transfer inquiry"). Furthermore, for example, the traveling lane adjustment device 10 may transmit, to a vehicle 20, information for inquiring whether to pay a larger usage fee for using the priority lane PL (hereinafter, the information is referred to as a "payment amount increase inquiry").

The vehicles 20 are vehicles traveling on a road including a general lane and a priority lane. The vehicles 20 are, for example, passenger cars, commercial vehicles (for example, trucks, dump trucks, and the like), or omnibuses (for example, buses, taxis, or the like).

The vehicles 20 each include various information processing devices (not illustrated). The vehicles 20 can transmit and receive information to and from the traveling lane adjustment device 10 via the information processing devices and the communication network 30. The vehicles 20 each transmit information indicating its own position to the traveling lane adjustment device 10. Furthermore, the vehicles 20 each transmit the priority lane travel request to the traveling lane adjustment device 10. The vehicles 20 each may receive the priority lane travel permission, the priority lane travel non-permission, the priority lane transfer instruction, the priority lane transfer inquiry, the payment amount increase inquiry, and the like from the traveling lane adjustment device 10.

The communication network 30 includes wireless and wired communication paths. For example, in the communication network 30, the traveling lane adjustment device 10 side is a wired communication path, and the vehicle 20 side is a wireless communication path. The communication network 30 includes, for example, the Internet.

[Configuration of Traveling Lane Adjustment Device]

Figures 2, 3:
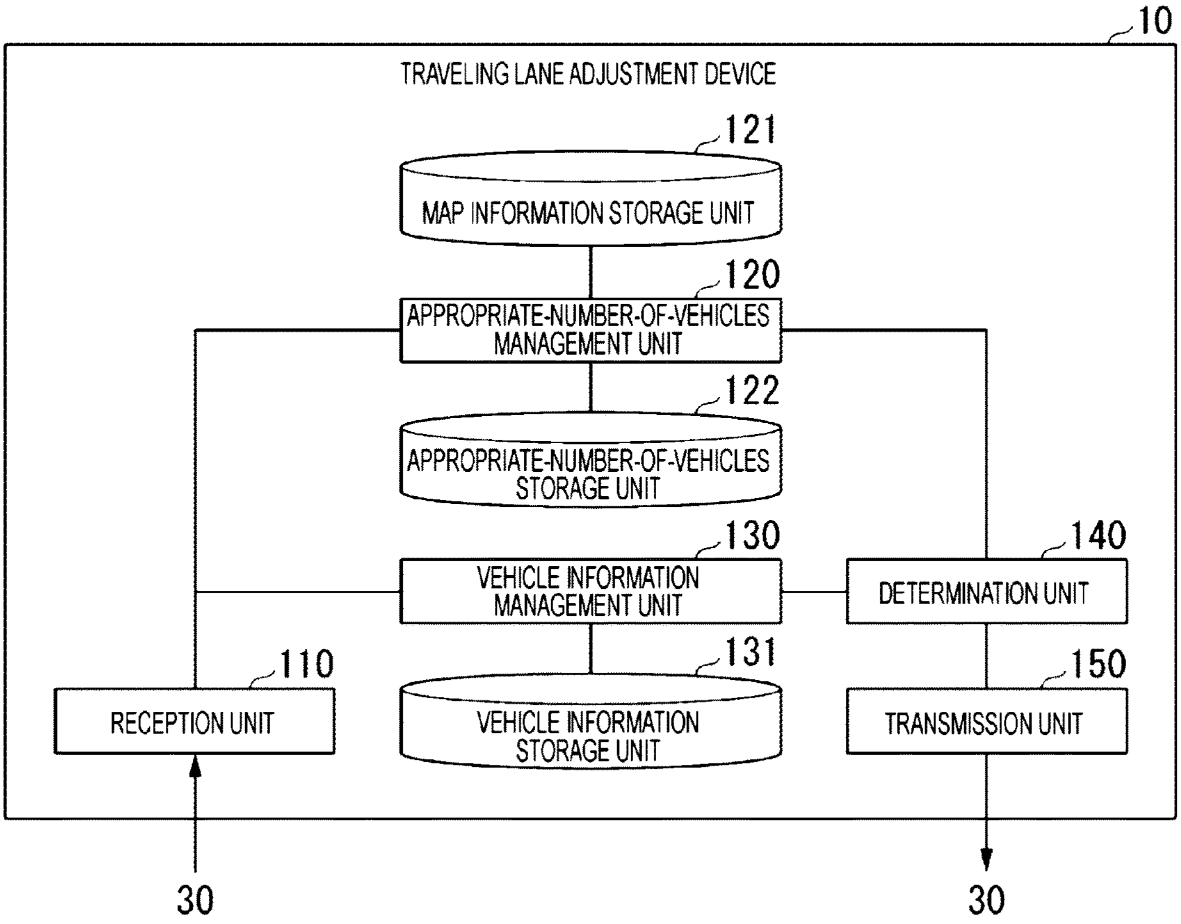
FIG. 2 is a block diagram illustrating a functional configuration of a traveling lane adjustment device 10 according to the first embodiment of the present invention.
FIG. 3 is a diagram illustrating an example of a configuration of a vehicle management table T1 according to the first embodiment of the present invention.

Hereinafter, a configuration of the traveling lane adjustment device 10 will be described. FIG. 2 is a block diagram illustrating a functional configuration of the traveling lane adjustment device 10 according to the first embodiment of the present invention. As illustrated in FIG. 2, the traveling lane adjustment device 10 includes a reception unit 110, an appropriate-number-of-vehicles management unit 120, a map information storage unit 121, an appropriate-number-of-vehicles storage unit 122, a vehicle information management unit 130, a vehicle information storage unit 131, a determination unit 140, and a transmission unit 150.

The reception unit 110 includes a communication interface that receives various types of information transmitted from the vehicles 20 via the communication network 30. For example, the reception unit 110 receives position information of the vehicles 20, a priority lane travel request, and the like, and distributes them to the appropriate-number-of-vehicles management unit 120 or the vehicle information management unit 130.

The appropriate-number-of-vehicles management unit 120 acquires, from the appropriate-number-of-vehicles storage unit 122, a predetermined appropriate maximum number of traveling vehicles on the priority lane PL for each specific section of the road. The appropriate-number-of-vehicles management unit 120 may acquire map information from the map information storage unit 121, divide the road into a plurality of specific sections on the basis of the acquired map information, and calculate the appropriate maximum number of traveling vehicles of the priority lane PL for each of the divided specific sections by itself on the basis of a predetermined calculation condition.

Note that the sections are set, for example, by the road being divided for each certain distance. Alternatively, the sections may be set such that the likelihood of occurrence of a traffic jam is classified into levels (for example, it is sorted into any one of five levels) for each location on the road on the basis of, for example, past traffic jam information, and points at which the levels are switched are set as points at which the sections change. In this case, for example, the past traffic jam information is stored in an internal or external database (not illustrated). As described above, in a case where the road is divided on the basis of the past traffic jam information, user convenience can be efficiently achieved by the present invention being intensively applied particularly for a section where a traffic jam is likely to occur.

The map information storage unit 121 stores the map information in advance. The map information includes a map of the road including the priority lane PL. The map information storage unit 121 includes, for example, a storage medium such as a hard disk drive (HDD), a flash memory, an electrically erasable programmable read only memory (EEPROM), a random access read/write memory (RAM), and a read only memory (ROM), or any combination of these storage media.

The appropriate-number-of-vehicles storage unit 122 stores in advance information indicating the appropriate maximum number of traveling vehicles of the priority lane PL for each specific section of the road. The appropriate-number-of-vehicles storage unit 122 includes, for example, a storage medium such as an HDD, a flash memory, an EEPROM, a RAM, or a ROM, or any combination of these storage media.

The vehicle information management unit 130 acquires the position information of each of the vehicles 20 and information regarding the vehicles 20 received by the reception unit 110. The information regarding the vehicles 20 includes vehicle identifiers (IDs) for identifying the vehicles 20 and information indicating traveling conditions. The vehicle information management unit 130 generates vehicle information on the basis of the position information for each of the vehicles 20 and the information regarding the vehicles 20, and records the generated vehicle information in a vehicle management table T1 stored in the vehicle information storage unit 131. Hereinafter, an example of the vehicle management table T1 stored in the vehicle information storage unit 131 will be described. FIG. 3 is a diagram illustrating an example of a configuration of the vehicle management table T1 according to the first embodiment of the present invention. The vehicle management table T1 illustrated in FIG. 3 represents a list of vehicle information in a certain specific section. As illustrated in FIG. 3, the vehicle management table T1 is tabular data in which values of an item of "vehicle ID", values of an item of "lane", and values of an item of "traveling condition" are associated with each other.

In the vehicle management table T1, vehicle IDs indicating the vehicles 20 traveling in the certain specific section are stored in the item of "vehicle ID". Information indicating the types of lanes on which the vehicles 20 are traveling in the certain specific section is stored in the item of "lane". Information that enables comparison of superiority and inferiority (that is, priority for traveling on the priority lane PL) between the vehicles 20 is stored in the item of "traveling condition".

In the first embodiment, the traveling conditions are desired payment amounts of the usage fee of the priority lane PL presented by the users. However, the traveling conditions are not limited to the amounts of money. For example, the traveling conditions may be rank information including, for example, predetermined stages including A rank, B rank, C rank, and the like obtained by dividing. In this case, for example, the rank information may be information obtained by ranking on the basis of the desired payment amounts of the usage fee of the priority lane PL. For example, the rank information may be information obtained by ranking on the basis of information regarding a passenger such as whether the user is a disabled person or the number of passengers of the vehicle 20. For example, the rank information may be information obtained by ranking on the basis of the type of vehicle such as a passenger car, a commercial vehicle, an omnibus (bus, taxi, or the like), and an emergency vehicle (fire engine, ambulance, or the like). Note that the rank information may be information obtained by combining the above information.

Note that, as the traveling conditions are conditions that can be more freely set by the users, as in a case of, for example, the desired payment amounts that can be freely presented by the users, the traveling lane can be more flexibly adjusted to meet the needs of the users.

The vehicle information management unit 130 grasps the position information of the vehicles 20 in units of lanes, and manages the number of actually traveling vehicles that is the number of vehicles that are actually traveling for each section of the road and for each traveling lane.

The vehicle information storage unit 131 stores the vehicle management table T1. The vehicle information storage unit 131 includes, for example, a storage medium such as an HDD, a flash memory, an EEPROM, a RAM, or a ROM, or any combination of these storage media.

The determination unit 140 acquires information indicating the appropriate maximum number of traveling vehicles in a certain section from the appropriate-number-of-vehicles management unit 120. The determination unit 140 also acquires the number of actually traveling vehicles in the section from the vehicle information management unit 130. The determination unit 140 determines whether to permit a vehicle 20 that has transmitted a priority lane travel request to travel on the priority lane PL on the basis of the acquired appropriate maximum number of traveling vehicles and number of actually traveling vehicles.

For example, the determination unit 140, the appropriate-number-of-vehicles management unit 120, and the vehicle information management unit 130 include a processor such as a central processing unit (CPU).

The transmission unit 150 includes a communication interface that transmits various types of information to the vehicles 20 via the communication network 30. Note that the transmission unit 150 and the reception unit 110 may be a functional unit that includes one piece of hardware as a transception unit.

The transmission unit 150 transmits priority lane travel permission to a vehicle 20 determined to be permitted to travel on the priority lane PL by the determination unit 140. The transmission unit 150 transmits priority lane travel non-permission to a vehicle 20 determined not to be permitted to travel on the priority lane PL by the determination unit 140. Note that, in a case where the vehicle 20 that has received notification of the priority vehicle travel permission or the priority vehicle travel non-permission is an automatic traveling vehicle, the vehicle 20 changes the course to the priority lane PL. In a case where the vehicle 20 is not an automatic traveling vehicle, the vehicle 20 notifies the driver of the notification content through an information control unit 230.

The transmission unit 150 may transmit the priority lane transfer instruction, the priority lane transfer inquiry, and the payment amount increase inquiry to a vehicle 20 on the basis of a determination result by the determination unit 140.

[Configuration of Vehicle]

Figure 4:
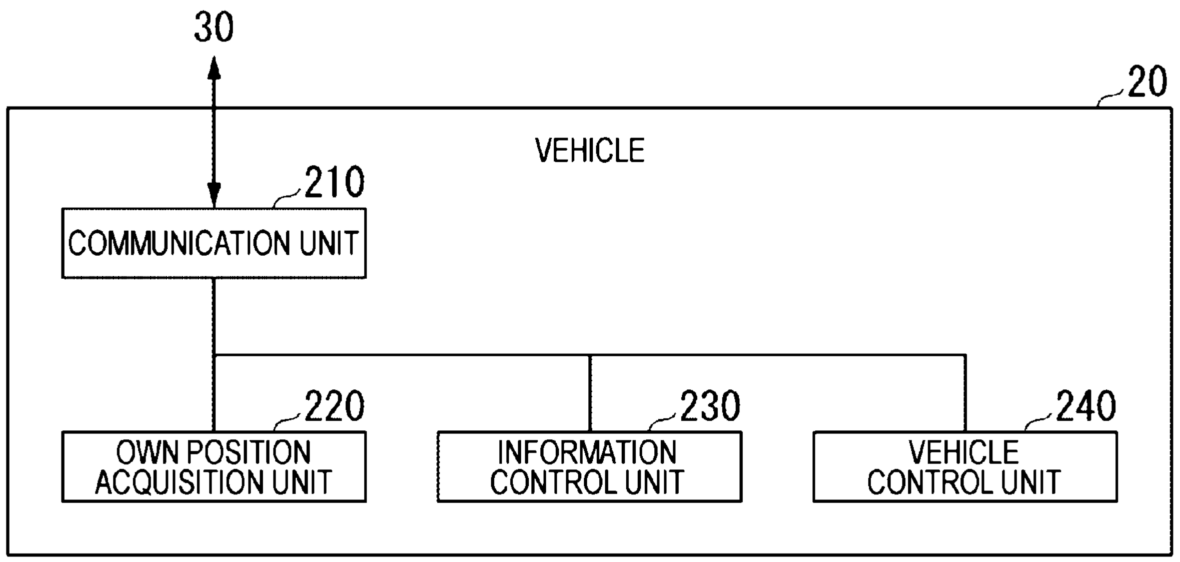
FIG. 4 is a block diagram illustrating a functional configuration of a vehicle 20 according to the first embodiment of the present invention.

Hereinafter, a configuration of a vehicle 20 will be described. FIG. 4 is a block diagram illustrating a functional configuration of a vehicle 20 according to the first embodiment of the present invention. As illustrated in FIG. 4, the vehicle 20 includes a communication unit 210, an own position acquisition unit 220, the information control unit 230, and a vehicle control unit 240. The communication unit 210 includes a communication interface that transmits various types of information to the traveling lane adjustment device 10 via the communication network 30 and receives various types of information transmitted from the traveling lane adjustment device 10 via the communication network 30.

The own position acquisition unit 220 acquires information indicating its own position of the vehicle 20. The own position acquisition unit 220 includes, for example, a global navigation satellite system (GNSS) receiver such as a global positioning system (GPS) receiver. Note that the own position acquisition unit 220 may acquire information indicating its own position positioned by a positioning system other than the GNSS. For example, the own position acquisition unit 220 may acquire information indicating its own position positioned by light detection and ranging, laser imaging detection and ranging (LiDAR), a positioning method based on a positional relationship with another vehicle 20, or the like.

The own position acquisition unit 220 transmits information indicating its own position to the traveling lane adjustment device 10 via the communication unit 210. Note that the information indicating its own position may be automatically transmitted from a car navigation system (not illustrated) or the like included in the vehicle 20 to the traveling lane adjustment device 10 via the communication unit 210.

The information control unit 230 mainly includes a function of controlling communication with a passenger of the vehicle 20. The information control unit 230 receives an operation input by a passenger through a user interface (UI) and performs various types of control of the vehicle 20. The information control unit 230 transmits various types of information to the traveling lane adjustment device 10 via the communication unit 210. The information control unit 230 acquires various types of information transmitted to the traveling lane adjustment device 10 via the communication unit 210, and performs various types of processing according to the acquired information.

The vehicle control unit 240 includes a function of controlling traveling of the vehicle 20. Note that the vehicle control unit 240 controls traveling of the vehicle 20 in accordance with an instruction based on an operation input by the passenger, an automatic driving control command input from an automatic driving control system (not illustrated) in a case of automatic driving, or the like.

Note that FIG. 4 illustrates a part of functional units of the information processing device included in the vehicle 20, and for example, description of a configuration related to traveling of the vehicle 20 such as an engine and a transmission is omitted.

[Operation of Traveling Lane Adjustment Device]

Hereinafter, an example of operation of the traveling lane adjustment device 10 will be described. The traveling lane adjustment device 10 according to the first embodiment receives a priority lane travel request transmitted from a vehicle 20 traveling on the general lane GL, and immediately determines whether to permit the vehicle 20 to travel on the priority lane PL.

Note that, here, the traveling lane adjustment device 10 is configured to determine whether to permit the vehicle 20 to travel on the priority lane PL on the basis of a desired payment amount of the user, but the present invention is not limited thereto. The traveling lane adjustment device 10 may perform determination on the basis of information other than the desired payment amount as long as the information enables comparison of superiority and inferiority between the vehicles 20.

Figure 5:
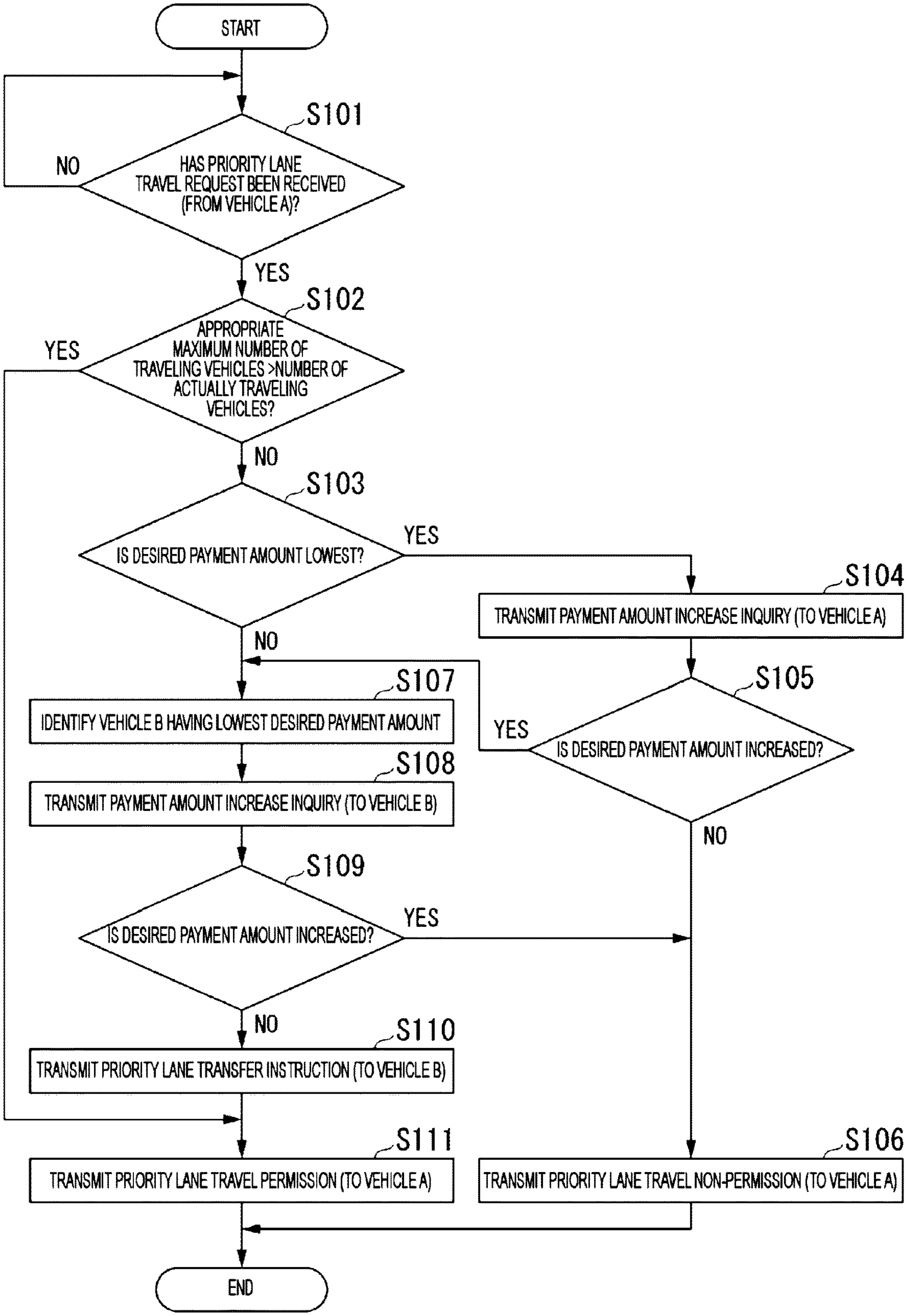
FIG. 5 is a flowchart illustrating operation of the traveling lane adjustment device 10 according to the first embodiment of the present invention.

FIG. 5 is a flowchart illustrating operation of the traveling lane adjustment device 10 according to the first embodiment of the present invention.

The reception unit 110 of the traveling lane adjustment device 10 waits for reception of a priority lane travel request transmitted from a vehicle 20 (step S101). In the first embodiment, the priority lane travel request includes at least the vehicle ID of the vehicle 20 that has transmitted the priority lane travel request and information indicating the desired payment amount of the usage fee for the priority lane PL.

In a case where the reception unit 110 receives the priority lane travel request (step S101·YES), the determination unit 140 acquires the appropriate maximum number of traveling vehicles in the range of a section in which the priority lane travel request has been made from the appropriate-number-of-vehicles management unit 120 and the number of actually traveling vehicles in the range of the section in which the priority lane travel request has been made from the vehicle information management unit 130, and compares the two values (step S102). Note that, here, the vehicle 20 that has transmitted the priority lane travel request is referred to as a "vehicle A". As a result of the comparison, in a case where the appropriate maximum number of traveling vehicles is larger than the number of actually traveling vehicles (step S102·YES), the transmission unit 150 transmits priority lane travel permission to the vehicle A (step S111). In this case, the operation of the traveling lane adjustment device 10 illustrated in the flowchart of FIG. 5 ends.

On the other hand, as a result of the comparison, in a case where the number of actually traveling vehicles is equal to or larger than the appropriate maximum number of traveling vehicles (step S102·NO), the determination unit 140 determines whether the desired payment amount of the user of the vehicle A (that is, desired payment amount included in the priority lane travel request) is lower than the desired payment amount of a user of any vehicle 20 traveling in the section in which the priority lane travel request has been made (step S103).

Note that the desired payment amount may be a standard amount fixed for each section of the road, or may be an amount varied depending on the time, day of the week, or the like. Alternately, the user may input the desired payment amount.

In a case where the desired payment amount of the user of the vehicle A is lower than the desired payment amount of the user of any vehicle 20 traveling in the section in which the priority lane travel request has been made (step S103·YES), the transmission unit 150 transmits, to the vehicle A, a payment amount increase inquiry inquiring whether to present a larger desired payment amount for using the priority lane PL (step S104). Here, the larger desired payment amount is an amount larger than the lowest desired payment amount among the vehicles 20 traveling in the section in which the priority lane travel request has been made.

In a case where there is a response indicating that the desired payment amount is not increased from the vehicle A or in a case where there is no response to the payment amount increase inquiry from the vehicle A (for example, in a case where there is no response even after a predetermined time elapses) (step S105·NO), the transmission unit 150 transmits the priority lane travel non-permission to the vehicle A (step S106). In this case, the operation of the traveling lane adjustment device 10 illustrated in the flowchart of FIG. 5 ends.

On the other hand, in a case where there is a response indicating that the desired payment amount is increased from the vehicle A, the determination unit 140 identifies a vehicle 20 presenting the lowest desired payment amount (hereinafter, the vehicle is referred to as a "vehicle B") among the vehicles 20 traveling in the section in which the priority lane travel request has been made (step S107).

The transmission unit 150 transmits a payment amount increase inquiry inquiring whether to present a larger desired payment amount for using the priority lane PL to the vehicle B (step S108). Here, the larger desired payment amount is an amount larger than the lowest desired payment amount among the vehicle A and other vehicles 20 traveling in the section in which the priority lane travel request has been made.

In a case where there is a response indicating that the desired payment amount is not increased from the vehicle B or in a case where there is no response to the payment amount increase inquiry from the vehicle B (for example, in a case where there is no response even after a predetermined time elapses) (step S109·NO), the transmission unit 150 transmits, to the vehicle B, a priority lane transfer instruction indicating an instruction for changing the lane of the vehicle B to the general lane GL and transferring the use of the priority lane PL to the vehicle A (step S110). The transmission unit 150 also transmits priority lane travel permission to the vehicle A (step S111). In this case, the operation of the traveling lane adjustment device 10 illustrated in the flowchart of FIG. 5 ends.

On the other hand, in a case where there is a response indicating that the desired payment amount is increased from the vehicle B (step S109·YES), the transmission unit 150 transmits priority lane travel non-permission to the vehicle A (step S106). Note that, in this case, the transmission unit 150 may further transmit a payment amount increase inquiry to the vehicle A to inquire of the user of the vehicle A about an increase in the desired payment amount, and perform use adjustment of the priority lane in an auction form between the user of the vehicle A and the user of the vehicle B. Note that, in a case of the auction form, the traveling lane adjustment device 10 may end use adjustment of the priority lane, for example, in a case where a predetermined time elapses or in a case where a predetermined upper limit of the desired payment amount is reached. Thus, the operation of the traveling lane adjustment device 10 illustrated in the flowchart of FIG. 5 ends.

Note that, in the first embodiment, the traveling lane adjustment device 10 performs adjustment for two types of traveling lanes of the general lane GL and the priority lane PL, but may perform adjustment for three or more types of traveling lanes having different priorities in stages. In this case, for example, the tolls of the traveling lanes may be set to be different in stages, and the higher the priority of the lane, the higher the usage fee may be set. In this way, a degree of a traffic jam and congestion in each of the lanes can be changed, and the road can be flexibly managed.

Note that, for example, a part of the payment amount may be refunded to a vehicle 20 that has received a priority lane transfer instruction immediately after the start of the use of the priority lane PL.

Note that the priority lane PL may be provided only when a traffic jam or congestion occurs, and all traveling lanes may be general lanes GL when there is no traffic jam or congestion.

As described above, in a case where the number of vehicles 20 actually traveling on the priority lane PL is equal to or larger than the upper limit of the appropriate number of vehicles 20 on the priority lane PL, the traveling lane adjustment device 10 according to the first embodiment of the present invention rejects a priority lane travel request or replaces one of the vehicles 20 actually traveling on the priority lane PL with a vehicle 20 that has transmitted a priority lane travel request, according to the desired payment amount. With such a configuration, the traveling lane adjustment device 10 according to the first embodiment of the present invention can always keep the number of vehicles 20 traveling on the priority lane PL within an appropriate number range, and thus can enable a user who uses the priority lane PL to avoid a traffic jam and congestion.

Second Embodiment

A second embodiment of the present invention will now be described with reference to the drawings. In the first embodiment described above, the traveling lane adjustment device 10 is configured to immediately adjust a vehicle 20 permitted to travel on a priority lane PL among a plurality of vehicles 20 traveling in a specific section of a road.

On the other hand, a traveling lane adjustment device 10 according to the second embodiment described below is configured to adjust a vehicle 20 permitted to reserve travel on a priority lane PL among a plurality of vehicles 20 scheduled to travel in a specific section of a road.

Note that an overall configuration of a traveling lane adjustment system 1, a configuration of the traveling lane adjustment device 10, and a configuration of a vehicle 20 according to the second embodiment are similar to those in the first embodiment described with reference to FIGS. 1 to 3, respectively, and thus the description thereof will be omitted.

[Operation of Traveling Lane Adjustment Device]

Hereinafter, an example of operation of the traveling lane adjustment device 10 will be described. Note that, here, the traveling lane adjustment device 10 is configured to determine whether to permit the vehicle 20 to travel on the priority lane PL on the basis of a desired payment amount of the user, but the present invention is not limited thereto. The traveling lane adjustment device 10 may perform determination on the basis of information other than the desired payment amount as long as the information enables comparison of superiority and inferiority between the vehicles 20.

Figure 6:
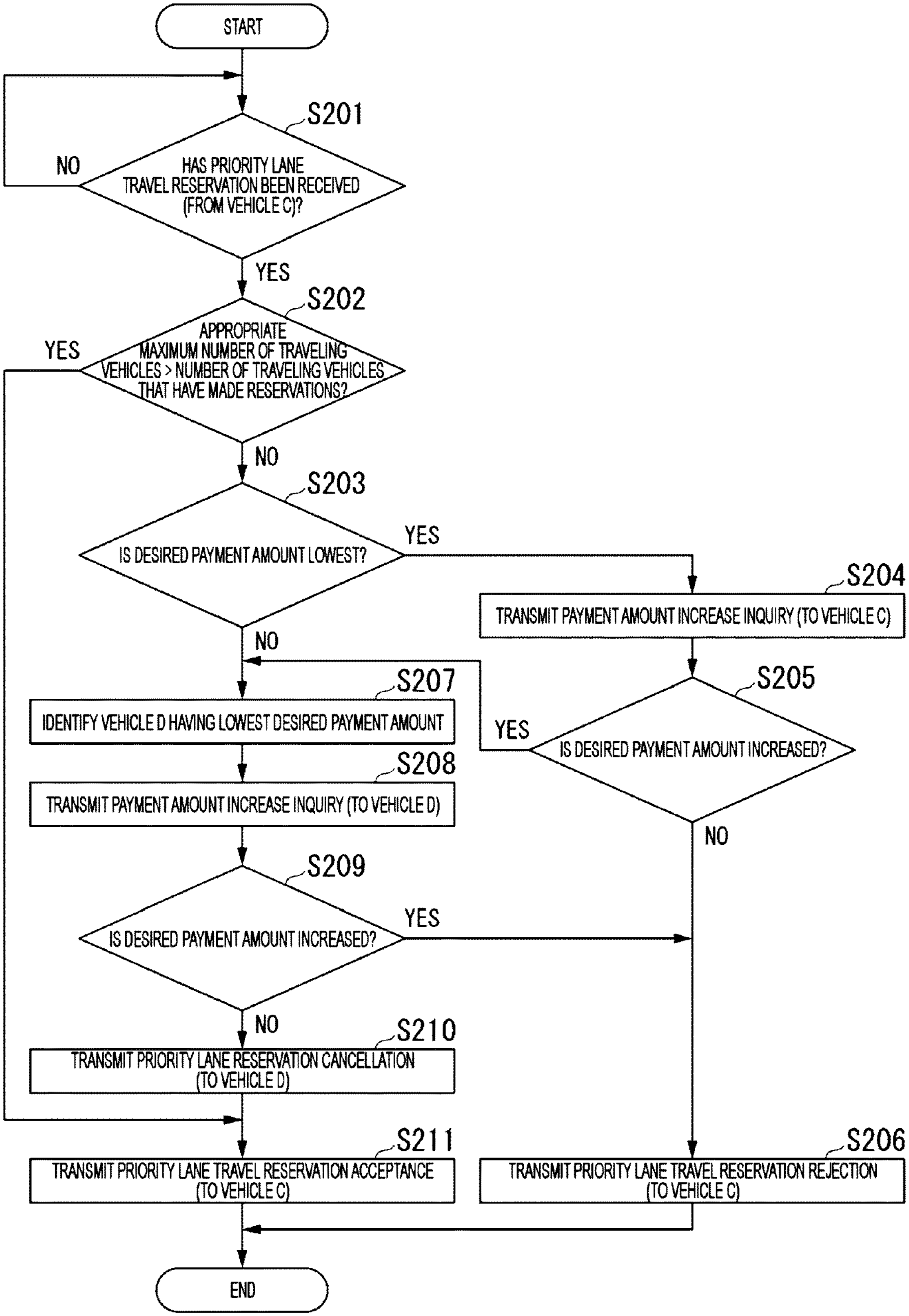
FIG. 6 is a flowchart illustrating operation of a traveling lane adjustment device 10 according to a second embodiment of the present invention.

FIG. 6 is a flowchart illustrating operation of the traveling lane adjustment device 10 according to the second embodiment of the present invention.

A reception unit 110 of the traveling lane adjustment device 10 waits for reception of information indicating a use reservation of a priority lane PL (hereinafter, the information is referred to as a "priority lane travel reservation") from a user, which is transmitted from a vehicle 20 (step S201). In the second embodiment, the priority lane travel reservation includes at least the vehicle ID of a vehicle 20 that has transmitted a priority lane travel request, information indicating a desired payment amount of the usage fee for the priority lane PL, information indicating a section in which travel on the priority lane PL is desired, and information indicating a time zone in which travel on the priority lane PL is desired.

Note that, instead of the information indicating a time zone in which travel on the priority lane PL is desired, information indicating time at which travel on the priority lane PL is desired may be used. However, the future use situation of the priority lane PL can be more accurately simulated in a case where the information indicating a time zone, such as from 18:00 to 19:00, is used, and thus, there is an effect that unclear future road traffic situations, individual situations of passengers, and the like can be more flexibly coped with.

In a case where the reception unit 110 receives the priority lane travel reservation (step S201·YES), a determination unit 140 acquires the appropriate maximum number of traveling vehicles in the range of a section in which the priority lane travel reservation has been made from an appropriate-number-of-vehicles management unit 120 and the number of traveling vehicles that have made reservations in the range of the section in which the priority lane travel reservation has been made from a vehicle information management unit 130, and compares the two values (step S202). The number of traveling vehicles that have made reservations here is the number of vehicles 20 having accepted reservations for travel on the priority lane PL in a specific time zone of a specific section. Note that, here, the vehicle 20 that has transmitted the priority lane travel reservation is referred to as a "vehicle C".

As a result of the comparison, in a case where the appropriate maximum number of traveling vehicles is larger than the number of traveling vehicles that have made reservations (step S202·YES), a transmission unit 150 transmits priority lane travel reservation acceptance to the vehicle C (step S211). Here, the priority lane travel reservation acceptance is information indicating that the reservation for travel on the priority lane PL is accepted for the vehicle 20 that has transmitted the priority lane travel reservation. In this case, the operation of the traveling lane adjustment device 10 illustrated in the flowchart of FIG. 6 ends.

On the other hand, as a result of the comparison, in a case where the number of traveling vehicles that have made reservations is equal to or larger than the appropriate maximum number of traveling vehicles (step S202·NO), the determination unit 140 determines whether the desired payment amount of the user of the vehicle C (that is, desired payment amount included in the priority lane travel reservation) is lower than the desired payment amount of a user of any vehicle 20 traveling in the section in which the priority lane travel reservation has been made (step S203).

Note that the desired payment amount may be a standard amount fixed for each section of the road, or may be an amount varied depending on the time, day of the week, or the like. Alternately, the user may input the desired payment amount.

In a case where the desired payment amount of the user of the vehicle C is lower than the desired payment amount of the user of any vehicle 20 traveling in the section in which the priority lane travel request has been made (step S203·YES), the transmission unit 150 transmits, to the vehicle C, a payment amount increase inquiry inquiring whether to present a larger desired payment amount for using the priority lane PL (step S204). Here, the larger desired payment amount is an amount larger than the lowest desired payment amount among the vehicles 20 traveling in the section in which the priority lane travel reservation has been made.

In a case where there is a response indicating that the desired payment amount is not increased from the vehicle C or in a case where there is no response to the payment amount increase inquiry from the vehicle C (for example, in a case where there is no response even after a predetermined time elapses) (step S205·NO), the transmission unit 150 transmits priority lane travel reservation rejection to the vehicle C (step S206). Here, the priority lane travel reservation rejection is information indicating that the reservation for travel on the priority lane PL is rejected for the vehicle 20 that has transmitted the priority lane travel reservation. In this case, the operation of the traveling lane adjustment device 10 illustrated in the flowchart of FIG. 6 ends.

On the other hand, in a case where there is a response indicating that the desired payment amount is increased from the vehicle C, the determination unit 140 identifies a vehicle 20 presenting the lowest desired payment amount (hereinafter, the vehicle is referred to as a "vehicle D") among the vehicles 20 traveling in the section in which the priority lane travel request has been made (step S207).

The transmission unit 150 transmits a payment amount increase inquiry inquiring whether to present a larger desired payment amount for using the priority lane PL to the vehicle D (step S208). Here, the larger desired payment amount is an amount larger than the lowest desired payment amount among the vehicle C and other vehicles 20 traveling in the section in which the priority lane travel request has been made.

In a case where there is a response indicating that the desired payment amount is not increased from the vehicle D or in a case where there is no response to the payment amount increase inquiry from the vehicle D (for example, in a case where there is no response even after a predetermined time elapses) (step S209·NO), the transmission unit 150 transmits, to the vehicle D, priority lane reservation cancellation indicating that the use reservation of the priority lane PL of the vehicle D is canceled (step S210). The transmission unit 150 also transmits priority lane travel reservation acceptance to the vehicle C (step S211). In this case, the operation of the traveling lane adjustment device 10 illustrated in the flowchart of FIG. 6 ends.

On the other hand, in a case where there is a response indicating that the desired payment amount is increased from the vehicle D (step S209·YES), the transmission unit 150 transmits priority lane travel reservation rejection to the vehicle C (step S206). Note that, in this case, the transmission unit 150 may further transmit a payment amount increase inquiry to the vehicle C to inquire of the user of the vehicle C about an increase in the desired payment amount, and perform use adjustment of the priority lane in an auction form between the user of the vehicle C and the user of the vehicle D. Thus, the operation of the traveling lane adjustment device 10 illustrated in the flowchart of FIG. 6 ends.

As described above, in a case where the number of vehicles 20 that have made reservations for travel on the priority lane PL is equal to or larger than the upper limit of the appropriate number of vehicles 20 on the priority lane PL, the traveling lane adjustment device 10 according to the second embodiment of the present invention rejects a priority lane travel reservation or cancels a reservation of a vehicle 20 that has made a reservation of travel on the priority lane PL and accepts a new priority lane travel reservation from a vehicle 20, according to the desired payment amount. With such a configuration, the traveling lane adjustment device 10 according to the second embodiment of the present invention can perform control such that the number of vehicles 20 traveling on the priority lane PL in a reserved time zone falls within an appropriate number range, and thus can enable a user who uses the priority lane PL to avoid a traffic jam and congestion.

Third Embodiment

A third embodiment of the present invention will now be described with reference to the drawings. In the first embodiment described above, the traveling lane adjustment device 10 is configured to perform control such that the number of vehicles 20 traveling on a priority lane PL always falls within a range of the appropriate number of vehicles, and prevents occurrence of a traffic jam and congestion in the priority lane PL.

On the other hand, a traveling lane adjustment device 10 according to the third embodiment described below is configured to perform adjustment such that a specific vehicle 20 can preferentially use a priority lane PL, for example, even when a traffic jam or congestion occurs in the priority lane PL by urging a plurality of vehicles 20 traveling on the priority lane PL to transfer the use of the priority lane PL. The traveling lane adjustment device 10 according to the third embodiment includes a mechanism for giving a reward to a vehicle 20 that transfers the use of the priority lane PL in order to urge transfer of the use of the priority lane PL.

Note that an overall configuration of a traveling lane adjustment system 1, a configuration of the traveling lane adjustment device 10, and a configuration of a vehicle 20 according to the third embodiment are similar to those in the first embodiment described with reference to FIGS. 1 to 3, respectively, and thus the description thereof will be omitted.

[Operation of Traveling Lane Adjustment Device]

Figure 7:
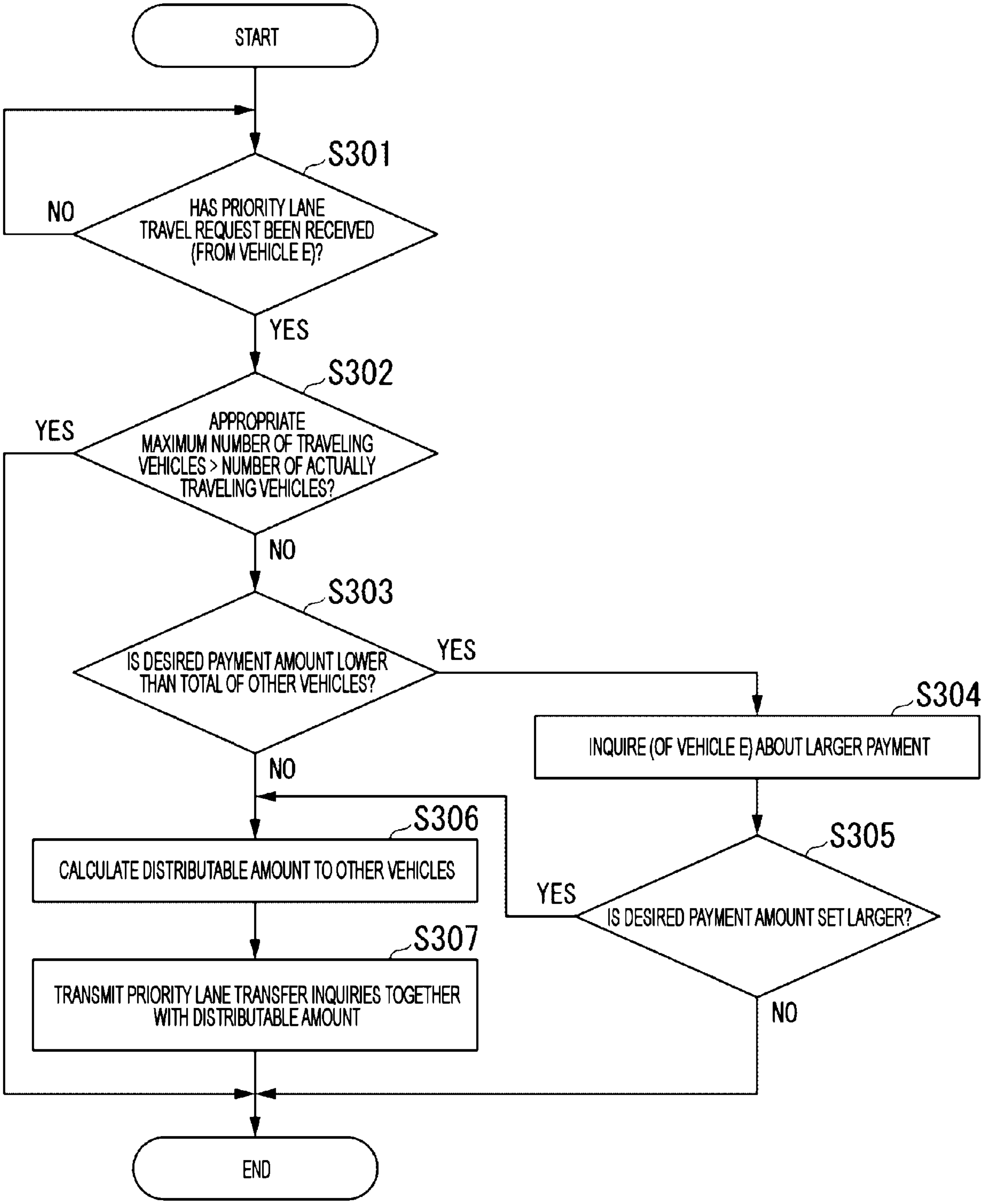
FIG. 7 is a flowchart illustrating operation of a traveling lane adjustment device 10 according to a third embodiment of the present invention.

Hereinafter, an example of operation of the traveling lane adjustment device 10 will be described. FIG. 7 is a flowchart illustrating operation of the traveling lane adjustment device 10 according to the third embodiment of the present invention.

A reception unit 110 of the traveling lane adjustment device 10 waits for reception of a priority lane travel request transmitted from a vehicle 20 (step S301). In the third embodiment, the priority lane travel request includes at least information indicating the vehicle ID of the vehicle 20 that has transmitted the priority lane travel request, a desired payment amount of the usage fee for the priority lane PL, and the number of vehicles 20 from which travel on the priority lane PL is desired to be transferred (that is, number of vehicles 20 desired to change the lane from the priority lane PL to the general lane GL).

In a case where the reception unit 110 receives the priority lane travel request (step S301·YES), the determination unit 140 acquires the appropriate maximum number of traveling vehicles in the range of a section in which the priority lane travel request has been made from the appropriate-number-of-vehicles management unit 120 and the number of actually traveling vehicles in the range of the section in which the priority lane travel request has been made from the vehicle information management unit 130, and compares the two values (step S302). Note that, here, the vehicle 20 that has transmitted the priority lane travel request is referred to as a "vehicle E".

The number of vehicles 20 from which travel on the priority lane PL is desired to be transferred included in the priority lane travel request may be directly input by a passenger of the vehicle E, for example. Alternatively, the number of vehicles 20 from which travel on the priority lane PL is desired to be transferred may be formed such that, for example, a degree of a traffic jam to be mitigated (for example, high, medium, or low) is designated by the passenger of the vehicle E, and the vehicle information management unit 130 of the traveling lane adjustment device 10 converts the degree into the number of vehicles 20 to be caused to perform transfer on the basis of a predetermined rule. Alternatively, the number of vehicles 20 from which travel on the priority lane PL is desired to be transferred may be formed such that, for example, a desired required time for passing a specific section (for example, passage within 15 minutes or the like) is designated by the passenger of the vehicle E, and the vehicle information management unit 130 of the traveling lane adjustment device 10 converts the required time into the number of vehicles 20 to be caused to perform transfer on the basis of a predetermined rule.

As a result of the comparison, in a case where the appropriate maximum number of traveling vehicles is larger than the number of actually traveling vehicles (step S302·YES), the operation of the traveling lane adjustment device 10 illustrated in the flowchart of FIG. 7 ends.

On the other hand, as a result of the comparison, in a case where the number of actually traveling vehicles is equal to or larger than the appropriate maximum number of traveling vehicles (step S302·NO), the determination unit 140 determines whether the desired payment amount of the user of the vehicle E (that is, desired payment amount included in the priority lane travel request) is lower than the total of the desired payment amounts for the number of vehicles 20 desired to be urged to perform transfer among the vehicles 20 traveling in the section in which the priority lane travel request has been made (step S303).

Note that the desired payment amount may be a standard amount fixed for each section of the road, or may be an amount varied depending on the time, day of the week, or the like. Alternately, the user may input the desired payment amount.

In a case where the desired payment amount of the user of the vehicle E is lower than the total of the desired payment amounts for the number of vehicles 20 desired to be urged to perform transfer (step S303·YES), a transmission unit 150 transmits, to the vehicle E, a payment amount increase inquiry inquiring whether to present a larger desired payment amount for using the priority lane PL (step S304). Here, the larger desired payment amount is an amount larger than the total of the desired payment amounts for the number of vehicles 20 that are traveling in the section in which the priority lane travel request has been made and desired to be urged to perform transfer. In a case where there is a response indicating that the desired payment amount is not increased from the vehicle E or in a case where there is no response to the payment amount increase inquiry from the vehicle E (for example, in a case where there is no response even after a predetermined time elapses) (step S305·NO), the operation of the traveling lane adjustment device 10 illustrated in the flowchart of FIG. 7 ends.

On the other hand, in a case where a response indicating that the desired payment amount is increased is received from the vehicle E, the determination unit 140 calculates an amount distributable to the users of the vehicles 20 desired to be urged to perform transfer (hereinafter referred to as a "distributable amount") from the desired payment amount of the user of the vehicle E, the number of vehicles 20 desired to be urged to perform transfer, and the total of the desired payment amounts of the users of the vehicles 20 desired to be urged to perform transfer (step S306).

The transmission unit 150 transmits priority lane transfer inquiries together with information indicating the distributable amount to the vehicles 20 desired to be urged to perform transfer (step S307). Thus, the operation of the traveling lane adjustment device 10 illustrated in the flowchart of FIG. 7 ends.

Hereinafter, a simple specific example will be described. For example, in a case where three vehicles 20 are desired to be urged to perform transfer, the user of the vehicle E urges the users of 10 vehicles 20 to perform transfer since the users of all the vehicles 20 do not necessarily perform transfer. For example, in a case where the desired payment amount of the user of the vehicle E is 1000 yen, a fixed amount, for example, 100 yen is deducted as a distribution fee on the operator side of the traveling lane adjustment system 1, and the remaining 900 yen is presented as a distributable amount for the 10 vehicles 20. In this case, since 900 yen is distributed to the 10 vehicles, the reward per user of a vehicle 20 who is urged to perform transfer is 90 yen. Here, the reward is evenly distributed to the users of all the vehicles 20 urged to perform transfer, but the present invention is not limited thereto. For example, the reward may be distributed in proportion to the payment amount for each of the vehicles 20 urged to perform transfer using the priority lane PL. The distribution fee may not be deducted on the operator side of the traveling lane adjustment system 1.

As described above, the traveling lane adjustment device 10 according to the third embodiment of the present invention distributes an amount based on a desired payment amount by a user of a specific vehicle 20 as a reward to a plurality of other vehicles 20 traveling on a priority lane PL in a case where the user of the specific vehicle 20 desires to travel on the priority lane PL after urging the plurality of other vehicles 20 traveling on the priority lane PL to change the lane to a general lane GL. As a result, a lane change to the general lane GL is urged. With such a configuration, the traveling lane adjustment device 10 according to the third embodiment of the present invention can perform adjustment such that a specific vehicle 20 traveling on a priority lane PL can easily avoid a traffic jam and congestion.

Note that the configurations of the traveling lane adjustment devices 10 according to the first to third embodiments described above can be combined with each other.

According to the above-described embodiments, an information processing device includes a travel request acquisition unit (a travel request acquirer), a number-of-vehicles acquisition unit (a number-of-vehicles acquirer), a determination unit (a determiner), and a transmission unit (a transmitter). For example, the information processing device is the traveling lane adjustment device 10 in the embodiments, the travel request acquisition unit is the vehicle information management unit 130 in the embodiments, the number-of-vehicles acquisition unit is the appropriate-number-of-vehicles management unit 120 in the embodiments, the determination unit is the determination unit 140 in the embodiments, and the transmission unit is the transmission unit 150 in the embodiments.

The travel request acquisition unit acquires travel request information for requesting travel permission of a specific road by a first vehicle. For example, the first vehicle is a vehicle 20 that has transmitted a priority lane travel request in the embodiments, the specific road is a priority lane PL in the embodiments, a second vehicle is a vehicle 20 that is traveling (or has reserved travel) on the priority lane PL in the embodiments, and the travel request information is a priority lane travel request in the embodiments.

The number-of-vehicles acquisition unit acquires the number of traveling vehicles indicating the number of a plurality of second vehicles traveling on the specific road. For example, the number of traveling vehicles is the number of actually traveling vehicles or the number of traveling vehicles that have made reservations in the embodiments. The determination unit determines traveling availability on the basis of the number of traveling vehicles and the appropriate number of vehicles indicating the appropriate number of vehicles traveling on the specific road. For example, the appropriate number of vehicles is the appropriate maximum number of traveling vehicles in the embodiments. The transmission unit transmits information indicating a determination result of the traveling availability to the first vehicle. For example, the information indicating a determination result of the traveling availability is priority lane travel permission or priority lane travel non-permission in the embodiments.

Note that, in the above information processing device, the travel request information may include information indicating a travel section and a scheduled travel time zone of the first vehicle in the specific road. In this case, the number-of-vehicles acquisition unit acquires the number of scheduled traveling vehicles indicating the number of second vehicles scheduled to travel in the travel section in the scheduled travel time zone. For example, the number of scheduled traveling vehicles is the number of traveling vehicles that have made reservations in the embodiments. In this case, the determination unit determines traveling availability on the basis of the number of scheduled traveling vehicles and the appropriate number of vehicles.

Note that, in the above information processing device, in a case where the number of traveling vehicles is equal to or larger than the appropriate number of vehicles, the determination unit may identify the second vehicle caused to terminate travel on the specific road, or determine that travel disapproval for the first vehicle on the basis of a priority set for each vehicle. For example, the priority is information that enables comparison of superiority and inferiority (that is, priority for traveling on the priority lane PL) between vehicles 20 in the embodiments, causing termination of travel on the specific road means causing a lane change from the priority lane PL to a general lane GL in the embodiments, and determining travel disapproval means determining that travel of the priority lane PL is not permitted in the embodiments. In this case, the transmission unit transmits instruction information instructing termination of travel on the specific road to the second vehicle identified by the determination unit, or transmits information indicating the determination result indicating travel disapproval to the first vehicle. For example, the instruction information instructing termination of travel on the specific road is the priority lane transfer instruction in the embodiments, and the determination result indicating travel disapproval is priority lane travel non-permission in the embodiments.

Note that, in the above information processing device, the priority may be set according to a payment amount for travel on the specific road. For example, the payment amount is a desired payment amount in the embodiments.

Note that, in the above information processing device, the determination unit may transmit information inquiring whether to increase the payment amount to the second vehicle or the first vehicle before the transmission unit transmits the instruction information to the second vehicle or before the transmission unit transmits information indicating the determination result indicating the travel disapproval to the first vehicle. For example, the information inquiring whether to increase the payment amount is a payment amount increase inquiry in the embodiments.

Note that, in the above information processing device, the transmission unit may transmit, to the second vehicle, information indicating a reward amount obtained in a case where travel on the specific road is terminated. For example, the reward amount obtained in a case where travel on the specific road is terminated is a distributable amount given to the user of a vehicle 20 that transfers the use of the priority lane PL in the embodiments.

A part or all of the traveling lane adjustment device 10 in each of the embodiments described above may be implemented by a computer. In that case, a program for implementing this function may be recorded in a computer-readable recording medium, and the program recorded in the recording medium may be read and executed by a computer system to implement the function. Note that the "computer system" mentioned herein includes an OS and hardware such as peripheral devices. The "computer-readable recording medium" refers to a portable medium such as a flexible disk, a magneto-optical disc, a ROM, or a CD-ROM, or a storage device such as a hard disk included in the computer system. The "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. The above program may be for implementing some of the functions described above, may implement the functions described above in combination with the program already recorded in the computer system, or may be implemented by using a programmable logic device such as a field programmable gate array (FPGA).

Although the embodiment of the present invention has been described in detail with reference to the drawings, specific configurations are not limited to the embodiment and include design and the like without departing from the gist of the present invention.

REFERENCE SIGNS LIST

1 Traveling lane adjustment system
10 Traveling lane adjustment device
13 Vehicle information management unit
20 Vehicle
30 Communication network
110 Reception unit
120 Appropriate-number-of-vehicles management unit
121 Map information storage unit
122 Appropriate-number-of-vehicles storage unit
130 Vehicle information management unit
131 Vehicle information storage unit
140 Determination unit
150 Transmission unit
210 Communication unit
220 Own position acquisition unit
230 Information control unit
240 Vehicle control unit

The invention claimed is:

1. An information processing device comprising:
a memory; and
a processor connected to the memory,
wherein the memory stores a specific road and an appropriate number of vehicles indicating an appropriate number of vehicles traveling on the specific road with each other, and
the processor is configured to:
acquire travel request information for requesting travel permission of the specific road by a first vehicle;
acquire a number of traveling vehicles indicating a number of a plurality of second vehicles traveling on the specific road;
determine traveling availability of the specific road by the first vehicle on a basis of the number of traveling vehicles and the appropriate number of vehicles stored in the memory; and
transmit information indicating a determination result of the traveling availability to the first vehicle.

2. The information processing device according to claim 1, wherein the travel request information includes information indicating a travel section and a scheduled travel time zone of the first vehicle in the specific road, the processor is configured to acquire a number of scheduled traveling vehicles indicating a number of the second vehicles scheduled to travel in the travel section in the scheduled travel time zone, and the processor is configured to determine the traveling availability on a basis of the number of scheduled traveling vehicles and the appropriate number of vehicles.

3. The information processing device according to claim 1, wherein the processor is configured to identify the second vehicle caused to terminate travel on the specific road, or determine travel disapproval for the first vehicle on a basis of a priority set for each vehicle in a case where the number of traveling vehicles is equal to or larger than the appropriate number of vehicles, and the processor is configured to transmit instruction information instructing termination of travel on the specific road to the second vehicle identified, or transmit information indicating the determination result indicating the travel disapproval to the first vehicle.

4. The information processing device according to claim 3, wherein the priority is set according to a payment amount for travel on the specific road.

5. The information processing device according to claim 4, wherein the processor is configured to transmit information inquiring whether to increase the payment amount to the second vehicle or the first vehicle before the instruction information is transmitted to the second vehicle or before information indicating the determination result indicating the travel disapproval is transmitted to the first vehicle.

6. The information processing device according to claim 1, wherein the processor is configured to transmit, to the second vehicle, information indicating a reward amount obtained in a case where travel on the specific road is terminated.

7. A traveling lane adjustment system, comprising:

one or more vehicles including the first vehicle; and a traveling lane adjustment device configured with a transmitter and an information processing device according to claim 1, where the information processing device transmits, via the transmitter, the information indicating a determination result of the traveling availability to the first vehicle over a communication network.

8. The traveling lane adjustment system of claim 7 wherein the first vehicle is configured to receive the information indicating a determination result of the traveling availability from the traveling lane adjustment device and operates to change course to a priority lane on the specific road in response to receiving the information indicating a determination result.

9. An information processing method comprising:

storing, in a memory of an information processing device, a specific road and an appropriate number of vehicles indicating an appropriate number of vehicles traveling on the specific road with each other;

acquiring travel request information for requesting travel permission of the specific road by a first vehicle;

acquiring a number of traveling vehicles indicating a number of a plurality of second vehicles traveling on the specific road;

determining traveling availability of the specific road by the first vehicle on a basis of the number of traveling vehicles and the appropriate number of vehicles stored in the memory; and transmitting information indicating a determination result of the traveling availability to the first vehicle.

10. A non-transitory computer readable medium which stores a program for causing a computer to execute steps, the step comprising:

making a memory of an information processing device store a specific road and an appropriate number of vehicles indicating an appropriate number of vehicles traveling on the specific road with each other;

acquiring travel request information for requesting travel permission of the specific road by a first vehicle;

acquiring a number of traveling vehicles indicating a number of a plurality of second vehicles traveling on the specific road;

determining traveling availability of the specific road by the first vehicle on a basis of the number of traveling vehicles and the appropriate number of vehicles stored in the memory; and transmitting information indicating a determination result of the traveling availability to the first vehicle.

* * * * *